United States Patent [19]

Ono et al.

[11] Patent Number: 4,483,940

[45] Date of Patent: Nov. 20, 1984

[54] METHOD FOR MANUFACTURE OF HONEYCOMB CATALYST

[75] Inventors: Tetsuji Ono, Amagasaki; Shoichi Ichihara, Toyonaka; Tomohisa Ohata, Suita; Sadao Terui, Osaka, all of Japan

[73] Assignee: Nippon Shokubai Kagaku Kogyo Co., Ltd., Osaka, Japan

[21] Appl. No.: 451,475

[22] Filed: Dec. 20, 1982

[30] Foreign Application Priority Data

Nov. 24, 1981 [JP] Japan ............................... 56-186943
Dec. 1, 1981 [JP] Japan ............................... 56-191795
Dec. 22, 1981 [JP] Japan ............................... 56-206245

[51] Int. Cl.$^3$ ............................................. B01J 31/06
[52] U.S. Cl. ........................................ 502/159; 502/523; 423/213.5
[58] Field of Search ................ 502/159, 527, 182, 185

[56] References Cited

U.S. PATENT DOCUMENTS

| | | | |
|---|---|---|---|
| 3,565,830 | 2/1971 | Keith et al. ........................ | 502/242 |
| 3,785,998 | 1/1974 | Hoekstra .............................. | 502/334 |
| 4,028,275 | 6/1977 | Sakai et al. ...................... | 502/527 X |
| 4,233,187 | 11/1980 | Atwood et al. ................. | 502/527 X |
| 4,253,992 | 3/1981 | Soejima et al. ................. | 502/527 X |

*Primary Examiner*—Patrick Garvin
*Attorney, Agent, or Firm*—Omri M. Behr

[57] ABSTRACT

A method for the manufacture of a honeycomb carrier of enhanced resistance to thermal shocks, which method comprises applying a coat of water-soluble high-molecular organic compound to the surface of a ceramic honeycomb carrier of monolithic construction and subsequently depositing a catalyst component on the resultant coated carrier.

23 Claims, No Drawings

METHOD FOR MANUFACTURE OF HONEYCOMB CATALYST

BACKGROUND OF THE INVENTION

1. Field of the Invention

This invention relates to a method for the manufacture of a honeycomb catalyst. More particularly, the invention relates to a method for the manufacture of a ceramic honeycomb catalyst of monolithic construction capable of enhanced resistance to thermal shocks.

2. Description of Prior Arts

Generally a honeycomb catalyst is a composite formed by depositing on a ceramic carrier of monolithic construction a catalyst composition formed preponderantly of an active refractory metal oxide such as alumina, alumina-silica, titania or zirconia and a catalyst component made of a platinum family metal such as platinum, palladium, rhodium or ruthenium, and further incorporating, when necessary, a transient metal such as copper, nickel, cobalt or iron, or an oxide thereof, and a rare earth element such as cerium or lanthanum.

This honeycomb catalyst is extensively used in internal combustion engines such as of automobiles for treating their exhaust gases and depriving them of air pollutants such as carbon monoxide, hydrocarbons and nitrogen oxides, and in industries in general for deodorizing waste gases and encouraging catalytic combustions aimed at primary energy generation. When it is used for an automobile, for example, since the temperature of the catalyst in use is varied minute by minute by the operating condition of the automobile, the honeycomb catalyst is required to possess an ability to resist thermal shocks. In the honeycomb catalyst of monolithic construction, strain tends to develop between the ceramic honeycomb carrier and the catalyst composition deposited on the carrier because they have different thermal expansion coefficients. As the cycle of violent temperature change often repeats, the honeycomb catalyst eventually sustains cracks. When the cracks gradually gain in growth, they may break the catalyst itself into two or more pieces and jeopardize safe service of the catalyst in the worst case. The possibility of the honeycomb catalyst encountering this accident has been pointed out.

Particularly when the honeycomb catalyst is disposed near the engine outlet, because the exhaust gas has a high temperature and the working temperature of the honeycomb catalyst is accordingly fluctuated in a wide renge, it naturally follows that the honeycomb catalyst is demanded to possess high physical strengths, particularly high resistance to thermal shocks.

When the honeycomb catalyst is used in an ordinary industry such as for the purpose of burning a fuel on the honeycomb catalyst thereby ensuring complete-oxidation combustion of the fuel and utilizing the heat of the combustion as the primary energy source for a gas turbine, for example, the honeycomb catalyst is destined to undergo a sharp rise of temperature at the outset of the operation and a sharp fall of temperature at the termination of the operation.

If the thermal shocks due to the sharp temperature changes break the catalyst, there ensues a possibility that some of the fragments of the broken catalyst will injure the turbine or cause other similar serious accidents. In this application, therefore, the honeycomb catalyst is likewise demanded to possess an ability to resist thermal shocks.

An object of this invention, therefore, is to provide a novel method for the manufacture of a honeycomb catalyst.

Another object of this invention is to provide a method for the manufacture of a ceramic honeycomb catalyst of monolithic construction capable of enhanced resistance to thermal shocks.

SUMMARY OF THE INVENTION

The object of the invention described above are accomplished by a method for the manufacture of a honeycomb catalyst capable of enhanced resistance to thermal shocks, which honeycomb catalyst comprises a ceramic honeycomb carrier of monolithic construction, a coat of a water-soluble high-molecular organic compound applied to the surface of the carrier, and a catalyst composition deposited on the coated carrier.

In accordance with this invention, the ability of the honeycomb catalyst to resist thermal chocks can be notably improved without inducing various practical problems such as separation of the layer of catalyst composition from the honeycomb carrier due to vibrations of the automobile body and incessant flow of the exhaust gas during the operation of the automobile or exerting any adverse effects upon the activity of the catalyst.

The honeycomb catalyst produced by the conventional method is directly affected by sharp temperature changes occurring during the use of the catalyst, because the honeycomb carrier and the catalyst composition deposited thereon have mutually different thermal expansion coefficients as described above. Particularly the ceramic honeycomb containing pores of an average pore diameter of 1 to 10 microns tends to suffer from occurrence of hair cracks because the honeycomb carrier and the particles of a catalyst component such as alumina which have been admitted into and deposited inside the fine pores of the carrier have different thermal expansion coefficients. For the purpose of precluding the occurrence of such cracks in the carrier apparently due to the difference between the thermal expansion coefficients of the honeycomb carrier and the catalyst composition deposited on the carrier, this invention contemplates first coating the surface of the honeycomb carrier with a high molecular organic compound, depositing the catalyst composition on the coated carrier, and burning the resultant composite honeycomb catalyst. During this burning, the cast of the aforementioned high molecular organic compound deposited in advance on the honeycomb carrier is burnt out to leave behind a gap resembling a thin film partly between the honeycomb carrier and the catalyst composition deposited thereon. This intervening gap serves to discourage the occurrence of strain due to the aforementioned difference in thermal expansion coefficient. By the method for this invention, the degree of the ability to resist thermal shocks the produced honeycomb catalyst is desired to possess can be varied by suitably varying the amount of the high molecular organic compound deposited in advance on the honeycomb carrier, namely the thickness of the deposited coat of the organic compound.

This invention further provides a method of treatment aimed at preventing the ceramic honeycomb carrier from the phenomenon of etching encountered during the deposition of the catalyst composition. The conventional method produces a catalyst by provisionally coating a honeycomb carrier with an active refractory metal oxide such as active alumina and then causing a catalyst composition formed of base metal compounds and noble metal compounds of catalyst-component elements to be dispersed and deposited in the coat. The aqueous dispersant or aqueous solution to be used in the treatment for coating and the treatment for dispersion and deposition is generally used in a form containing an organic carboxylic acid or a mineral acid for the purpose of stabilization. This acid component tends to persist in the carrier after the treatment for coating and the treatment for dispersion and deposition. When the composite catalyst is kept at elevated temperatures as during the drying or calcining, for example, the remaining acid goes to etching the honeycomb carrier and seriously depriving the carrier of its mechanical strengths and consequently encouraging the possibility of the produced catalyst suffering from occurrence of hair cracks.

Although the aforementioned treatment for coating the honeycomb carrier with the high molecular organic compound is capable of mitigating the inclination toward etching, it is still incapable of thoroughly precluding the occurrence of hair cracks. The inventors have found that highly effective prevention of the occurrence of hair cracks is obtained by causing the carrier composition containing the persistent acid to come into contact with a basic compound before exposure thereof to elevated temperatures thereby allowing the acid to be neutralized with the basic compound. With this discovery, they have perfected an improved method for the manufacture of a honeycomb catalyst.

PREFERRED EMBODIMENT OF THE INVENTION

The high molecular organic compound to be used in the present invention is desired to be soluble in water by reason of ease of handling and utilized in the form of aqueous solution. The molecular weight of this high molecular compound is desired to be at least 200. It is preferred to exceed 500. The amount of the compound to be used is limited by the viscosity of said aqueous solution. The viscosity of said aqueous solution is desired to be not more than 500 cp (centipoises), desirably not more than 200 cp, and particularly desirably not more than 100 cp. The high molecular organic compound to be used in the present invention is desired to be capable of forming what is called a film after the coat of the compound applied to the carrier is dried and exhibiting affinity for the aqueous medium containing the catalyst composition during the subsequent step for the deposition of the catalyst composition. Specifically desirable examples of the water-soluble high molecular organic compound include various kinds of starch (wheat, corn, potato and tapioca), glue plant, soybean casein, natural gums such as gum arabic and tragacanth gum, animal glues, casein, various processed starches, starch derivatives, methyl cellulose, ethyl cellulose, hydroxyethyl cellulose, carboxymethyl cellulose, various polyvinyl alcohols, polyacrylic acid and derivatives thereof, and maleic acid-based copolymers such as vinyl acetate-maleic anhydride copolymer and styrenemaleic acid copolymer. These compounds may be used either singly or in the form of mixtures of two or more members. In due consideration of the film-forming property and the ease of deposition on the carrier in a later step, various polyvinyl alcohols, homopolymer and copolymers of acrylic acid and derivatives thereof, and maleic acid-based copolymers prove particularly desirable among other compounds satisfying the requirement. The best choices are polyvinyl alcohols, homopolymer and copolymers of acrylic acid and derivatives thereof. Polyvinyl alcohols having molecular weights in the range of 500 to 100,000, preferably 500 to 5,000, and saponification values in the range of 70 to 100, preferably 80 to 100 prove desirable among other polyvinyl alcohols. Examples of homopolymer and copolymers of acrylic acid and derivatives thereof include polyacrylic acid and ammonium salts thereof (such as those having molecular weights in the rnage of 500 to 100,000, preferably 500 to 10,000), copolymers of acrylic acid with other copolymerizable monomers (such as, for example, 2-hydroxyethyl acrylate, 2-hydroxyethyl methacrylate, acrylamide, and methacrylamide) and ammonium salts thereof. Examples of maleic acid-based copolymers include vinyl acetate-maleic anhydride copolymer, styrene-maleic acid copolymer and ammonium salts thereof.

The aforementioned high molecular organic compound can be used in any amount falling in the range of 0.5 to 50% by weight, preferably 1 to 20% by weight, in terms of concentration in an aqueous solution. The optimum amount of this compound may be determined by taking into due consideration the viscosity and the film-forming property of the compound in question.

The method for depositing a coat of this organic compound on the ceramic honeycomb carrier comprises immersing the honeycomb carrier in an aqueous solution of the water-soluble high-molecular organic compound (under normal pressure, reduced pressure, or increased pressure), then removing the honeycomb carrier, placing the drenched honeycomb carrier in a forced current of air thereby blowing the excess solution off the honeycomb carrier, and drying the wet honeycomb carrier at temperatures in the range of from room temperature up to 200° C., namely at temperatures at which the water-soluble high-molecular organic compound is not impaired in quality as by combustion, or subjecting the wet honeycomb carrier to the subsequent step for catalyst deposition. The deposition of the catalyst composition on the coat of the water-soluble high-molecular organic compound deposited in advance on the honeycomb carrier can be carried out by any of the known methods. The amount of the water-soluble high-molecular organic compound to be deposited in the form of a coat on the honeycomb carrier is desired to fall in the range of 0.02 to 10 parts by weight, preferably 0.1 to 5 parts by weight, as solids based on 100 parts by weight of the carrier.

In the manufacture of the honeycomb catalyst, the following methods are available for coating the honeycomb carrier.

(A) A method which comprises coating the carrier with a soluble compound of an active refractory metal oxide such as soluble alumina slurry, calcining the coated carrier thereby giving rise to a coating film of active refractory metal oxide such as active alumina film on the carrier, subsequently depositing a catalytically active component on the coated carrier, and calcining the resultant composite.

(B) A method which comprises coating the carrier with an active refractory metal oxide such as active alumina slurry, calcining the coated carrier, then depositing a catalytically active component on the coated carrier, and calcining the resultant composite.

(C) A method which comprises admixing part of a catalytically active component with slurry of an active refractory metal oxide, coating the carrier with the resultant mixture, calcining the coated carrier, then depositing the remaining catalytically active component on the coated carrier, and subsequently calcining the resultant composite.

(D) A method which comprises admixing a catalytically active component with slurry of an active refractory metal oxide, coating the carrier with the resultant mixture, and calcining the coated carrier.

(E) A method which comprises preparing in advance a catalyst composition having a catalytically active component, i.e. a base metal element or noble metal element, dispersed and deposited first in the form of an oxide or metal on active refractory metal oxide particles, converting the resultant mixture into an aqueous dispersion, and coating the honeycomb carrier with the aqueous dispersion. For the purpose of this method, it suffices to bring the carrier and the catalyst composition into mutual contact by a very simple, single manipulation and to carry out the high-temperature treatment of calcining only in the fewest times. The method also has an advantage that the catalytically active component is stably and effectively utilized. By the conventional method, the honeycomb carrier is inevitably exposed to the acid component incorporated in the aqueous medium and is consequently etched by that acid component each time the coat of the active refractory metal oxide is deposited on the honeycomb carrier and each time the catalytically active component is deposited on the carrier. In accordance with the method of this invention, there is enjoyed an advantage that the etching is precluded to a fair extent because the carrier is coated in advance with the water-soluble high-molecular organic compound and the etching is substantially completely prevented because the acid component remaining in the carried composition is virtually completely neutralized with a basic compound.

Examples of the active refractory metal oxide to be effectively used in the present invention include alumina, silica-alumina, magnesia, titania, zirconia and silica-magnesia. Among other active refractory metal oxides, alumina and zirconia can be advantageously used in any of the forms of power spheres and cylinders. Especially, as the alumina alumina containing soluble hydrated alumina is preferable.

For use in this invention, the base metal element is selected from the group consisting of iron, cobalt, nickel, manganese, copper, silver, chromium, molybdenum, tungsten, titanium, zirconium, zinc, germanium, tin, lead, phosphorus, antimony, bismuth, rare earth elements, alkali metals and alkaline earth metals. These metals can be used in the form of any compounds. Examples of such compounds are nitrates, hydrochlorides, carbonates, organic acid salts, amine complex salts, hydroxides and oxides. Use of such a compound in the form of nitrate, carbonate, acetate, formate, hydroxide or oxide proves to be particularly advantageous.

For use in this invention, a noble metal element is selected from the group consisting of platinum, palladium, rhodium, ruthenium and iridium. The noble metal element available as a nitrate, hydrochloride, metallic acid or its salt is used in the form of an aqueous solution or colloid.

In the aforementioned methods, A, B, C and D, for the preparation of the catalyst composition, the catalyst composition is prepared by using either an active refractory metal oxide mentioned above or a precursor thereof and, when necessary, further using a base metal element and/or a noble metal element mentioned above by following the relevant procedure involved. The preparation of the catalyst composition is effected by causing the oxide or the precursor thereof such as, for example, a hydrate, and the base metal element and/or the noble metal element dispersed in the form of slurry in an aqueous medium to be deposited on the carrier which has been already coated with the high-molecular organic compound. During this step of deposition, any of the additives heretofore accepted in the art as useful for some purposes or others may be optionally added to the solution of the active refractory metal oxide or the precursor, a hydrate, in an aqueous medium. Examples of the colloidal refractory metal oxide effectively usable herein include boehmite-like hydrated alumina, alumina sol, silica sol and titania sol. In the form of a salt, aluminum nitrate [$Al(NO_3)_3$] is available. Acids available herein include nitric acid, hydrochloric acid and acetic acid. Generally, the deposition of such a catalytic composition in an aqueous medium on the honeycomb carrier is effected by immersing the honeycomb carrier in the aqueous medium of the catalyst composition, removing the honeycomb carrier from the aqueous medium, and blowing the excess slurry off the drenched honeycomb carrier as with highly compressed air thereby allowing the catalyst to be left deposited in a required amount on the carrier. After this step, the set honeycomb carrier is dried at temperatures of 80° to 200° C. and then calcined at temperatures of 200° to 800° C. This calcination is generally carried out in the air. When the compoiste contains a compound of noble metal element, it may be subjected to a treatment for reduction with hydrogen sulfide or hydrazine at room temperature or to a treatment for reduction in a current of nitrogen and hydrogen at temperatures of 100° to 600° C.

In the aforementioned methods A, B and C, the honeycomb carrier which has been coated in advance with the active refractory metal oxide or the active refractory metal oxide containing a base metal element is dried and calcined as described above, subsequently immersed in an aqueous solution of a base metal element compound and/or noble metal element compound, removed from the aqueous solution, and blown with compressed air to be freed from the excess aqueous solution. Consequently, the honeycomb carrier is coated with a required amount of the catalyst composition. Thereafter, the composite is dried at temperatures of 80° to 200° C. either immediately or subsequently to a treatment for reduction as with hydrogen sulfide or hydrazine at room temperature, optionally calcined in the air temperatures of 200° to 800° C. or reduced in a current of nitrogen and hydrogen at temperatures of 100° to 600° C. This completes the manufacture of the catalyst aimed at.

In the aforementioned method E, the preparation of the catalyst composition involves thoroughly mixing the aforementioned active refractory metal oxide or the precursor thereof such as, for example, a hydrate or partial hydrate with the base metal element compound and/or noble metal element compound in the form of an aqueous solution or slurry and drying and calcining or reducing the resultant mixture thereby having the components fixed on each other. The drying may be effectively carried out at temperatures of 80° to 200° C. and the calcination similarly at temperatures of 200° to 800° C., both in the air. The reduction may be effectively carried out as with hydrogen sulfide or hydrazine at room temperature or in a current of nitrogen and hydrogen at temperatures of 100° to 400° C.

The catalyst composition prepared as described above has the base metal element and/or noble metal element, the catalytically active component, dispersed and deposited and stably fixed in the form of an oxide or metal on the active refractory metal oxide. The aqueous dispersion of this catalyst composition to be used for coating the ceramic carrier, therefore, can be prepared with high stability.

The active refractory metal oxide or the precursor thereof such as a hydride or partial hydride may be in a form partially soluble in water or in the form of finely divided porous particles or in the form of shaped articles. Particularly a substance such as active alumina which has a large specific surface area is commercially avaialble in the form of porous shaped articles having an average diameter of 1 to 6 mm. This substance can be used in its unmodified form during the deposition of the catalytically active substance. It permits the catalytically active substance to be readily and uniformly dispersed within the shaped articles and, by the calcination at elevated temperatures, quite amply fixed therein.

The catalyst composition produced as described above from the oxide and/or metal element is then optionally curshed, mixed with water, further optionally mixed with a small amount of a colloidal refractory metal oxide, a salt of the metal just mentioned, or an acid component, and finely crushed with a wet crushing machine such as, for example, a ball mill or colloid mill to produce a slurry. This slurry is used in the subsequent step for coating the carrier.

Examples of the colloidal refractory metal oxide to be added in a small amount to the aqueous medium include boehmitelike hydrated alumina, alumina sol, silica sol and titania sol. Such a colloidal refractory metal oxide is added in an amount of 2 to 20% by weight based on the solids content of the catalyst composition. As a salt, aluminum nitrate [$Al(NO_3)_3$] is used, for example. This salt is added in an amount of 0.1 to 7% by weight as $Al(NO_3)_3$ based on the solids content of the catalyst composition. As an acid, there is used nitric acid, hydrochloric acid or acetic acid, for example. Such an acid may be added in an amount of 0.05 to 6% by weight based on the solids content of the catalyst composition.

In the slurry prepared as described above is immersed the honeycomb carrier which has been coated in advance with the water-soluble high-molecular organic compound as described above. The honeycomb carrier is removed from the slurry and then blown with highly compressed air to be freed from the excess slurry. Consequently, the honeycomb carrier is coated with the equired amount of the catalyst composition. When the aqueous medium containing the catalyst composition further contains a small amount of an acid component as described above, the honeycomb carrier drenched with the slurry may be exposed, optionally immediately after the immersion in the slurry or at a suitable time prior to the calcination, to an atmosphere containing a basic gas to have the residual acid component neutralized. This neutralization is desired to be carried out immediately after the immersion of the honeycomb carrier in the slurry. Even after the wet carrier has been dried, the neutralization may be effectively performed so far as it takes place prior to the calcination. To be specific, for this neutralization, the carrier is exposed to the atmosphere containing a basic gas under the temperature condition prior to the calcination, viz. at temperatures not exceeding 200° C., desirably at temperatures ranging from room temperature to 150° C., and particularly desirably at room temperature.

Examples of the basic gas to be effectively used in this invention include ammonia, hydrazine, methylamine, ethylamine and propylamine. These basic gases may be used either singly or in the form of a mixture of two or more members.

The concentration of the basic gas contained in the atmosphere is only required to be at least 0.1% by volume. It is used as mixed with dry or moist air or as with nitrogen. In view of cost and other similar factors, ammonia proves to be particularly desirable among other basic gases. It may be used effectively in the form of liquid ammonia. When ammonia is adopted, the exposure is preferably carried out under the conditions of 1 to 20% by volume of ammonia concentration in an atmopshere of air, 0.5 to 60 minutes, more desirably 1 to 30 minutes, of duration, and room temperature. Under these condition, the exposure has the best results.

The honeycomb carrier which has been coated with the catalyst composition is then dried at temperatures not exceeding 200° C., normally at temperatures of 100° to 150° C. and optionally calcined at themperatures not exceeding 800° C. to become a complete catalyst. The calcination may be omitted because the catalyst composition has already been calcined and converted consequently into an oxide or metal as described above. This omission adds to the economic advantage of the operation involved.

The ceramic honeycomb carrier to be used in this invention may be any of the ceramic honeycomb carriers generally accepted for commercial use in the art. Examples of particular desirable carriers are those of refractory ceramic materials such as cordierite, mullite, α-alumina, zirconia, titania, tianium phosphate, aluminium titanate petalite, spodumene, aluminosilicate, aluminium titanate magnesia, aluminium titanate mulite and magnesium silicate. These carriers give good results.

Now, the present invention will be described more specifically below with reference to working examples of the invention. This invention is not limited only to these examples.

EXAMPLE 1

The volume 1.0 liter of an aqueous solution containing 5% by weight of completely saponified polyvinyl alcohol of a molecular weight of 500 (made by Kuraray Co., Ltd. and marketed under trademark designation of PVA105) was prepared. A ceramic honeycomb of cordierite having 300 cells per square inch and measuring 90 mm in diameter and 110 mm in length (having an average pore diameter of 4 microns) was completely immersed in the aqueous solution for two minutes, then removed from the aqueous solution, blown with a forced current of air to be freed from the excess aqueous solution, and dried at 120° C. for about five hours. After the drying, the honeycomb carrier was found to have gained about 1 g of weight. The carrier which had undergone the coating treatment as described above was then immersed in 1.0 liter of an aqueous solution or slurry containing 25% by weight, as alumina, of soluble pseudo-boehmite for two minutes, removed from the aqueous solution, blown with a force current of air to be freed from the excess solution or slurry, dried at 120° C., and then calcined at 700° C. The coating of the carrier with the alumina component was repeated twice to have about 50 g of alumina deposited on the carrier. Thereafter, one liter of a catalyst solution, namely an aqueous hydrochloric acid solution of palladium chloride (having a hydrochloric acid content of 0.4 g) containing 1.4 g of Pd was heated to about 50° C. The aforementioned alumina-deposited carrier was immersed in the hot solution for one hour, then removed from the solution, dried at 120° C., and calcined at 700° C. to afford a complete catalyst.

EXAMPLE 2

A complete catalyst was obtained by following the procedure of Example 1, except that an aqueous solution containing 3% by weight of polyvinyl alcohol having a molecular weight of 1700 and a saponification degree of about 80% (produced by Kuraray Co., Ltd. and marketed under the trademark designation of PVA217) was used instead.

EXAMPLE 3

A complete catalyst was obtained by following the procedure of Example 1, except that an aqueous solution containing 3% by weight of thoroughly saponified polyvinyl alcohol having a molecular weight of 1700 (made by Kuraray Co., Ltd. and marketed under the trademark designation of PVA117) was used instead.

EXAMPLE 4

A complete catalyst was obtained by following the procedure of Example 1, except that an aqueous solution containing 5% by weight of polyammonium acrylate having a molecular weight of about 4000 was used instead.

EXAMPLE 5

A complete catalyst was obtained by following the procedure of Example 1, except that an aqueous solution containing 5% by weight of corn starch was used instead. Control 1

A complete catalyst was obtained by following the procedure of Example 1, except that the coating treatment involved in the procedure of Example 1 was omitted.

EXAMPLE 6

The procedure of Example 1 was followed. The same cordierite carrier as obtained in Example 1 by the coating treatment using an aqueous solution containing 3% by weight of thoroughly saponified polyvinyl alcohol having a molecular weight of 1700 (produced by Kuraray Co., Ltd. and marketed under the trademark designation of PVA117) was immersed for two minutes in a slurry obtained by adding 750 g of active alumina having a specific surface area of about 100 $m^2/g$ to 760 cc of an aqueous solution containing 25 g of aluminum nitrate and wet crushing the resultant mixture in a ceramic ball mill for 16 hours, then removed from the slurry, blown in a forced current of air to be freed from the excess slurry, dried at 120° C., and then calcined at 500° C. to have about 70 g of alumina deposited. Thereafter, 1 liter of a catalyst solution obtained by mixing an aqueous solution of platinic chloride containing 0.47 g of platinum and an aqueous hydrochloric acid solution of palladium chloride containing 0.23 g of palladium was heated to about 50° C. The aforementioned alumina-deposited carrier was immersed in the hot mixed solution, removed from the solution, dried at 120° C., and reduced in a current of nitrogen containing 5% by volume of hydrogen at 500° C. for one hour to affored a complete catalyst.

EXAMPLE 7

A complete catalyst was obtained by following the procedure of Example 6, except that an aqueous solution containing 10% by weight of thoroughly saponified polyvinyl alcohol having a molecular weight of 500 (made by Kuraray Co., Ltd. and marketed under the trademark designation of PVA105) was used instead. Control 2

A complete catalyst was obtained by following the procedure of Example 6, except that the coating treatment involved in the procedure of Example 6 was omitted.

EXAMPLE 8

The catalysts obtained in Examples 1–7 and in Controls 1,2 were tested for ability to resist thermal shocks as described below. A test specimen was mounted on a rack of mullite plate 15 mm in thickness, placed in an electric oven set at a varying temperature for 30 minutes, removed from the oven and transferred onto a rack held at room temperature, and allowed to cool off for 30 minutes. This series of heating and cooling was repeated three times. When the test specimen was not found to have sustained any visibly discernible cracks, it was further subjected to the same test as above, except that the temperature of the electric oven was increased by an increment of 50° C. The results were as shown in Table 1.

TABLE 1

|  | 500° C. | 550° C. | 600° C. | 650° C. | 700° C. | 750° C. |
|---|---|---|---|---|---|---|
| Example 1 | — | — | No abnormality observed | No abnormality observed | No abnormality observed | No abnormality observed |
| Example 2 | — | — | No abnormality observed | No abnormality observed | No abnormality observed | No abnormality observed |
| Example 3 | — | — | No abnormality observed | No abnormality observed | No abnormality observed | No abnormality observed |
| Example 4 | — | — | No abnormality observed | No abnormality observed | No abnormality observed | No abnormality observed |
| Example 5 | — | — | No abnormality observed | No abnormality observed | No abnormality observed | Occurrence of microcracks observed |
| Control 1 | — | — | No abnormality observed | Occurrence of microcracks observed | — | — |

TABLE 1-continued

|  | 500° C. | 550° C. | 600° C. | 650° C. | 700° C. | 750° C. |
|---|---|---|---|---|---|---|
| Example 6 | — | — | No abnormality observed | No abnormality observed | No abnormality observed | No abnormality observed |
| Example 7 | — | — | No abnormality observed | No abnormality observed | No abnormality observed | No abnormality observed |
| Control 2 | — | No abnormality observed | Occurrence of microcracks observed | — | — | — |

It is noted from Table 1 that the products of the working examples of this invention were invariably superior to those of controls.

EXAMPLE 9

The catalysts obtained in Examples 1–7 and Controls 1, 2 were tested for coating adherence property as indicated below.

Each sample was cut into cylinders measuring 25.4 mm in both diameter and height and the cylinders were thorough dried at 150° C. Each cylindrical specimen was suspended at the center of a 500-cc tall beaker containing 450 cc of cold water and exposed to the vibrations of an ultrasonic wave oscillator operated at an output rate of 200 W for 20 minutes. At the end of the standing, all the separated particles of coated catalyst scattered in the water of the beaker were collected by filtration and calcined at 500° C.

The coating adherence property was calculated in accordance with the following formula.

$$\text{Percent weight loss} = \frac{\text{Weight of separated particles of coated catalyst}}{\text{Initial weight of test specimen}} \times 100(\%)$$

The results of this test were as shown in Table 2 below.

TABLE 2

| Example 1 | 0.12% | by weight |
| Example 2 | 0.11 | by weight |
| Example 3 | 0.14 | by weight |
| Example 4 | 0.15 | by weight |
| Example 5 | 0.15 | by weight |
| Control 1 | 0.13 | by weight |
| Example 6 | 0.10 | by weight |
| Example 7 | 0.12 | by weight |
| Control 2 | 0.14 | by weight |

It is noted from Table 2 that no discernible difference in coating adherence property was observed between the products of the working examples of this invention and those of the controls.

EXAMPLE 10

The catalysts obtained in Examples 1–7 and Controls 1, 2 were tested for activity as indicated below.

A given sample was cut into cylinders measuring 33 mm in diameter and 76 mm in length. The cylinders were placed in a multi-converter and subjected to bench durability test using a 4-cylinder 2000-cc engine under the conditions of 750° C. of catalyst inlet temperature, 100 hours of duration, 100,000 hr$^{-1}$ of space velocity, and 15.5 of air-fuel ratio. The test specimen before and after the durability test was tested for catalytic activity under the conditions of 100,000 hr$^{-1}$ of space velocity and 15.5 of air-fuel ratio and evaluated for ability to remove hydrocarbon (HC) and carbon monoxide (CO). The results were as shown in Table 3 below.

TABLE 3

|  | Fresh activity at 400° C. (%) | | Activity after durability test at 400° C. (%) | |
|---|---|---|---|---|
|  | CO | HC | CO | HC |
| Example 1 | 98 | 96 | 96 | 91 |
| Example 2 | 98 | 96 | 96 | 91 |
| Example 3 | 98 | 96 | 96 | 91 |
| Example 4 | 98 | 96 | 96 | 91 |
| Example 5 | 98 | 96 | 96 | 91 |
| Control 1 | 98 | 96 | 96 | 91 |
| Example 6 | 98 | 97 | 97 | 92 |
| Example 7 | 98 | 97 | 97 | 92 |
| Control 2 | 98 | 97 | 97 | 92 |

It is noted from Table 3 that no discernible difference of activity was observed between the products of the working examples of this invention and those of the controls.

EXAMPLE 11

The volume 1.5 liters of an aqueous solution containing 5% by weight of thoroughly saponified polyvinyl alcohol having a molecular weight of 500 (made by Kuraray Co., Ltd. and marketed under the trademark designation of PVA105) was prepared. A cylindrical ceramic honeycomb of cordierite containing 300 cells per square inch and measuring 105.3 mm in diameter and 115 mm in length (having an average pore diameter of 4 microns) was completely immersed in the aforementioned aqueous solution for two minutes, then removed from the aqueous solution, blown with a forced current of air to be freed from the excess aqueous solution, and dried at 120° C. for about five hours. After the drying, the carrier was found to have gained about 1.5 g of weight.

Then, 1500 g of active alumina spheres having a specific surface area of 120 m$^2$/g and an average diameter of 3.3 mm were impregnated in 1.5 liters of an aqueous solution containing 75.7 g of dichlorotetramine palladium (Pd(NH$_3$)$_4$)Cl$_2$ and 22.5 g of acetic acid until palladium was uniformly dispersed throughout the entire carrier spheres, dried at 150° C., and calcined at 500° C. to afford a catalyst composition. This catalyst composition was added to 1512 cc of an aqueous solution containing 25.2 g of aluminum nitrate and the resultant mixture was crushed in a ball mill for 10 hours. The honeycomb carrier which had undergone the aforementioned coating treatment was immersed for one minute in the resultant slurry, removed from the slurry, blown with a forced current of air to be freed from the excess slurry, dried at 120° C., and calcined in the air at 400° C. to afford a complete catalyst containing 1.5 g of palladium and 70 g of catalyst composition.

EXAMPLE 12

A complete catalyst was obtained by following the procedure of Example 11, except that an aqueous solution containing 3% by weight of polyvinyl alcohol having a molecular weight of 1700 and a saponification degree of about 80% (made by Kuraray Co., Ltd. and marketed under the trademark designation of PVA217) was used instead.

EXAMPLE 13

A complete catalyst was obtained by following the procedure of Example 11, except that an aqueous solution containing 3% by weight of thoroughly saponified polyvinyl alcohol having a molecular weight of 1700 (made by Kuraray Co., Ltd. and marketed under the trademark designation of PVA117) was used instead.

EXAMPLE 14

A complete catalyst was obtained by following the procedure of Example 11, except that an aqueous solution containing 5% by weight of polyammonium acrylate having a molecular weight of about 4000 was used instead.

EXAMPLE 15

A complete catalyst was obtained by following the procedure of Example 11, except that an aqueous solution containing 5% by weight of corn starch was used instead. Control 3

A complete catalyst was obtained by following the procedure of Example 11, except that the coating treatment with polyvinyl alcohol involved in the procedure of Example 11 was omitted. Control 4

The same carrier as used in Example 11 was impregnated for one minute in a slurry obtained by adding 1500 g of active alumina particles (about 50 mesh) having a specific surface area of 120 m$^2$/g to 1512 cc of an aqueous solution containing 25.2 g of aluminum nitrate and crushing the resultant mixture in a ball mill for 16 hours, removed from the slurry, blown with a forced current of air to be freed from the excess slurry, dried at 120° C., and then calcined in the air at 500° C. to have about 71 g of alumina deposited. Then, the aforementioned alumina-deposited carrier was immersed for one minute in 1.5 liters of an aqueous nitric acid solution of palladium nitrate (containing 25.5 g of nitric acid) containing 18.75 g of palladium, removed from the aqueous solution, blown with a forced current of air to be freed from the excess aqueous solution, dried at 120° C., and then calcined in the air at 500° C. to afford a complete catalyst containing 1.5 g of palladium.

EXAMPLE 16

The same honeycomb carrier as used in Example 11 was subjected to the same coating treatment as involved in the procedure of Example 11. Then, 1500 g of active alumina cylinders having a specific surface area of 100 m$^2$/g and measuring 3 mm in diameter and about 6 mm in length were thoroughly impregnated with 1.5 liters of an aqueous solution containing 255.1 g of cerium nitrate (Ce(NO$_3$)$_3$) and 40.4 g of chloroplatinic acid, dried at 150° C., and calcined at 500° C. to afford a catalyst composition. This catalyst composition was added to 1650 cc of an aqueous solution containing 206. g of acetic acid, and the mixture was crushed in a ball mill for 20 hours to form a slurry. The honeycomb carrier coated as described above was immersed for two minutes in this slurry, removed from the slurry, blown with a forced current of air to be freed from the excess slurry, dried at 150° C., and reduced in a current of nitrogen containing 5% of hydrogen at 40° C. for one hour to afford a complete catalyst containing 1 g of platinum, 7 g of cerium oxide and 86 g of complete catalyst composition.

EXAMPLE 17

The same honeycomb carrier as used in Example 11 was subjected to the same coating treatment as involved in the procedure of Example 3. Then 1500 g of the same active alumina cylinders as used in Example 16 were impregnated in 1.5 liters of an aqueous solution containing 157.9 g of cerium nitrate and 508.6 g of nickel nitrate (Ni(NO$_3$)$_2$), dried at 150° C. and calcined at 600° C. The composition consequently obtained was wholly impregnated in 1.5 liters of an aqueous solution containing 23.6 g of dichlorodihydroxytetramine platinum [Pt(NH$_3$)$_4$(OH)$_2$]Cl$_2$, 4.2 g of trichlorohexamine rhodium [Rh(NH$_3$)$_6$]Cl$_3$, and 22.5 g of acetic acid until platinum and rhodium were uniformly dispersed in the carrier, dried at 150° C., and reduced at 400° C. for 30 minutes in a current of nitrogen containing 5% by hydrogen to afford a catalyst composition. This catalyst composition was added to 1778 cc of an aqueous solution containing 14.9 g of acetic acid, and the resultant mixture was crushed in a ball mill for 20 hours to afford a slurry. The aforementioned coated honeycomb carrier was immersed for one minute in this slurry, removed from the slurry, blown with a forced current of air to be freed from the excess slurry, and dried at 130° C. to afford a complete three-way conversion catalyst containing 0.9 g of platinum, 0.1 g of rhodium, 6 g of cerium oxide, 15 g of nickel oxide, and 130 g of complete catalyst composition.

EXAMPLE 18

The same honeycomb carrier as used in Example 11 was subjected to the same coating treatment as involved in the procedure of Example 13. Then, 1500 g of the same active alumina cylinders as used in Example 16 were impregnated in 1.5 liters of an aqueous solution containing 145.9 g of cerium nitrate (Ce(NO$_3$)$_3$), 233.2 g if ferric nitrate (Fe(NO$_3$)$_3$), 2.03 g of phosphoric acid, 19.11 g of chloroplatinic acid, 8.05 g of palladium nitrate and 2.61 g of rhodium chloride, dried at 150° C., and calcined at 600° C. to afford a catalyst composition. This catalyst composition was added to 1661 cc of an aqueous solution containing 13.8 g of nitric acid, and the resultant mixture was crushed in a ball mill for 20 hours to afford a slurry. The aforementioned coated honeycomb carrier was immersed for two minutes in the slurry, removed from the slurry, blown with a forced current of air to be freed of the excess slurry, exposed in an atmosphere of air containing about 2% by volume of ammonia at room temperature for 20 minutes, then dried at 130° C. to afford a complete three-way conversion catalyst containing 0.71 g of platinum, 0.29 g of palladium, 0.1 g of rhodium, 6 g of cerium oxide, 6 g of ferric oxide, 0.05 g phosphorus, and 130 g of complete catalyst composition.

EXAMPLE 19

The same honeycomb carrier as used in Example 11 was subjected to the same coating treatment as involved in the procedure of Example 11. Then, 1500 g of the same active alumina particles as used in control 4 and 78.3 g of ferric oxide particles were thoroughly mixed with 1.5 liters of an aqueous solution containing 148.4 g of cerium nitrate, 19.09 g of dinitrodiamino platinum (Pt(NH$_3$)$_2$(NO$_2$)$_2$), and 2.62 g of rhodium chloride, dried at 150° C., and calcined at 600° C. to afford a catalyst composition. This catalyst composition was added to 1670 cc of an aqueous solution containing 20.8 g of acetic acid and the resultant mixture was crushed in a ball mill for 20 hours to afford a slurry. The aforementioned coated honeycomb carrier was immersed for one minute in this slurry, removed from the slurry, blown with a forced current of air to be freed from the excess slurry, and dried at 150° C. to afford a complete three-way conversion catalyst containing 0.89 g of platinum, 0.099 g of rhodium, 6 g of cerium oxide, 6 g of a ferric oxide and 128 g of complete catalyst composition.

EXAMPLE 20

The same honeycomb carrier as used in Example 11 was subjected to the same coating treatment as involved in the procedure of Example 14. Then, 1900 g of pseudoboehmite alumina particles (having an alumina content of 75%) were thoroughly mixed with 2.0 liters of an aqueous solution containing 301 g of lanthanum nitrate (La(NO$_3$)$_3$) and 53.3 g of palladium chloride. The resultant mixture was dried at 150° C., and calcined at 600° C. to afford a catalyst composition. This catalyst composition was added in conjunction with 100 g of the same pseudoboehmite to 1683 cc of an aqueous solution containing 27.6 g of nitric acid, and the resultant mixture was crushed in a ball mill for 18 hours to afford a slurry. The aforementioned coated honeycomb carrier was immersed for two minutes in this slurry, removed from the slurry, blown with a forced current of air to be freed from the excess slurry, dried at 150° C., and then calcined at 500° C. to afford a complete catalyst containing 1.5 g of palladium 7.1 g of lanthanum oxide, and 79 g of catalyst composition.

EXAMPLE 21

The same honeycomb carrier as used in Example 11 was subjected to the same coating treatment as involved in the procedure of Example 12. Then, 1500 g of the same active alumina cylinders as used in Example 16 were impregnated in 1.5 liters of an aqueous solution containing 69.6 g of dichlorotetramine palladium [Pd(NH$_3$)$_4$]Cl$_2$ and 22.5 g of acetic acid until palladium was uniformly dispersed throughout the carrier, dried at 150° C., and calcined at 500° C. to afford a catalyst composition. This catalyst composition was added to 1530 cc of an aqueous solution and the resultant mixture was crushed in a ball mill for 30 hours to afford a slurry. The aforementioned coated honeycomb carrier was immersed in this slurry, removed from the slurry, blown with a forced current of air to be freed from the excess slurry, and dried at 130° C. to afford a complete catalyst containing 1.4 g of palladium and 71 g of catalyst composition.

EXAMPLE 22

The catalysts obtained in Examples 11-21 and Controls 3, 4 were tested for ability to resist thermal shocks as indicated below. A given test specimen was mounted on a rack of a mullite plate 15 mm in thickness, placed for 30 minutes in an electric oven set at a varying temperature, removed as mounted on the rack from the oven and transferred into an open room at room temperature, and allowed to cool off for 30 minutes. The series of heating and cooling was repeated 10 times. When the test specimen thus treated was found to have sustained no visually discernible cracks, the specimen was subjected to the same test, with the temperature increased by an increment of 50° C. The results were as shown in Table 4 below.

TABLE 4

| | 500° C. | 550° C. | 600° C. | 650° C. | 700° C. | 750° C. |
|---|---|---|---|---|---|---|
| Example 11 | No abnormality observed | No abnormality observed | No abnormality observed | No abnormality observed | No abnormality observed | No abnormality observed |
| Example 12 | No abnormality observed | No abnormality observed | No abnormality observed | No abnormality observed | No abnormality observed | No abnormality observed |
| Example 13 | No abnormality observed | No abnormality observed | No abnormality observed | No abnormality observed | No abnormality observed | No abnormality observed |
| Example 14 | No abnormality observed | No abnormality observed | No abnormality observed | No abnormality observed | No abnormality observed | No abnormality observed |
| Example 15 | No abnormality observed | No abnormality observed | No abnormality observed | No abnormality observed | No abnormality observed | No abnormality observed |
| Control 3 | No abnormality observed | No abnormality observed | Occurrence of microcracks observed | Occurrence of microcracks observed | — | — |
| Control 4 | No abnormality observed | Occurrence of microcracks observed | — | — | — | — |
| Example 16 | No abnormality observed | No abnormality observed | No abnormality observed | No abnormality observed | No abnormality observed | No abnormality observed |
| Example 17 | No abnormality observed | No abnormality observed | No abnormality observed | No abnormality observed | No abnormality observed | No abnormality observed |
| Example 18 | No abnormality observed | No abnormality observed | No abnormality observed | No abnormality observed | No abnormality observed | No abnormality observed |
| Example 19 | No abnormality observed | No abnormality observed | No abnormality observed | No abnormality observed | No abnormality observed | No abnormality observed |
| Example 20 | No abnormality observed | No abnormality observed | No abnormality observed | No abnormality observed | No abnormality observed | No abnormality observed |
| Example 21 | No abnormality observed | No abnormality observed | No abnormality observed | No abnormality observed | No abnormality observed | No abnormality observed |

It is noted from Table 4 that the products of the working examples of this invention were inveriably superior to those of the controls.

EXAMPLE 23

By following the procedure of Example 3, a ceramic honeycomb carrier of cordierite having 200 cells per square inch and measuring 25.4 mm in diameter and 76.2 mm in length was subjected to a coating treatment. Then, the carrier was coated with active alumina, dried and calcined by following the procedure of Example 6 to have about 3.9 g of alumina deposited thereon. Then 50 cc of an aqueous solution of chloroplatinic acid containing 0.20 g of platinum was heated to about 50° C. The aforementioned aluminadeposited carrier was immersed in the hot aqueous solution for one hour, then removed from the aqueous solution, dried at 120° C., and subsequently calcined in the air at 400° C. for one hour, to afford a complete catalyst containing 0.19 g of platinum.

This catalyst was placed in a cylindrical combustion apparatus. An air-methane mixed gas containing 3% of methane was introduced into the combustion apparatus at an inlet linear velocity of 15 m/sec, with the preheating temperature fixed at 550° C. The methane in the mixed gas was substantially completely burnt on the catalyst, with the catalyst outlet temperature reaching 1250° C. The combustion gas had a $NO_x$ content of not more than 1 ppm and a total unburnt methane and CO content of not more than 1 ppm.

When the supply of fuel was cut after one hour into the combustion period, the catalyst outlet temperature instantaneously fell to 650° C.

After the supply of fuel was alternately continued and discontinued 20 times by intervals of 15 minutes, the complete combustion was obtained during each period of fuel supply without any damage to the catalyst.

EXAMPLE 24

The catalyst obtained in Example 11-15, 16 and 20-21 and control 3 and 4 were tested for activity as described in Example 10. Test results were as shown in Table 5 below.

TABLE 5

| | Fresh Activity at 400° C. (%) | | Activity after durability test at 400° C. (%) | |
|---|---|---|---|---|
| | CO | HC | CO | HC |
| Example 11 | 98 | 95 | 96 | 90 |
| Example 12 | 98 | 95 | 96 | 90 |
| Example 13 | 98 | 95 | 96 | 90 |
| Example 14 | 98 | 95 | 96 | 90 |
| Example 15 | 98 | 95 | 96 | 90 |
| Control 3 | 98 | 95 | 96 | 90 |
| Control 4 | 98 | 95 | 96 | 90 |
| Example 16 | 99 | 97 | 98 | 93 |
| Example 20 | 98 | 96 | 97 | 91 |
| Example 21 | 98 | 95 | 96 | 90 |

It is noted from Table 5 that no discernible difference of activity was observed between the products of the working examples of this invention and those of the controls.

EXAMPLE 25

Activity Test for the three-way conversion catalysts obtained in Example 17, 18 and 19 was performed as follows:

Durability test was performed using engine dynamometer, and fuel injection type gasoline engine. Catalyst sample was exposed in a multi chamber reactor as described in Example 10. Catalyst inlet temperature were maintained at 700° C. Space velocity was constant at 120,000 $hr^{-1}$(STP) and exhaust gas was controlled nearly stoichiometric air-fuel ratio for 100 hours. Evaluation of the fresh and aged catalyst efficiency was simulated actual closed-loop feed back controlled engine using air-fuel ratio perturbation method as described in SAE 770371.

The reaction conditions were as follows: The temperature of the inlet gas was adjusted to 400° C., and the space velocity of the gas was adjusted to 100,000 $hr^{-1}$. In order for the gas at the inlet of the catalyst layer to simulate the characteristics of an exhaust gas of an actual closed-loop engine, a perturbated gas having an amplitude of ±1.0 A/F at 1 Hz controlled by an external oscillator signal was fed, and its average fuel air-fuel ratio was varied from 0.3 A/F on the rich side to 0.3 A/F on the lean side with the stoichiometric point as a center. The concentrations of the inlet gas and the outlet gas were analyzed, and the conversion efficiencies of the gases were calculated.

In a graph plotting the average air-fuel ratio against the conversion with regard to each of the catalysts, the conversion at the point of crossing between the curve of carbon monoxide (CO) conversion and the curve of nitrogen monoxide (NO) conversion was defined as a crossover point value (COP), and the conversion of hydrocarbon (HC) at the corresponding air-fuel ratio was made a standard of evaluation.

The conversions of CO, HC and NO with respect to the average air-fuel ratio 0.1 A/F on the lean side in each of the catalysts were also made standards of evaluation.

The three-way conersion performances of the catalysts are summarized in Table 6.

TABLE 6

| | Fresh activity | | | | | Activity after durability test | | | | |
|---|---|---|---|---|---|---|---|---|---|---|
| | CO-NO COP | HC value of the COP | Conversions at +0.1 A/F | | | CO-NO COP | HC value of the COP | Conversions at +0.1 A/F | | |
| | | | CO | HC | NO | | | CO | HC | NO |
| Example 17 | 95 | 97 | 97 | 98 | 77 | 92 | 95 | 96 | 95 | 64 |
| Example 18 | 97 | 95 | 98 | 98 | 74 | 93 | 94 | 96 | 94 | 60 |
| Example 19 | 97 | 95 | 98 | 98 | 76 | 93 | 94 | 96 | 94 | 62 |

From Table 6, it can be seen that all the tested catalysts shows favorable performance in efficiency.

What is claimed is:

1. A method for the manufacture of a honeycomb carrier of enhanced resistance to thermal shocks, which method comprises applying a coat of a water-soluble high-molecular organic compound to the surface of a ceramic honeycomb carrier of monolithic construction and subsequently depositing a catalyst component on the resultant coated carrier.

2. A method according to claim 1, wherein said application of the coat of a water-soluble high-molecular organic compound is effected by immersing said honeycomb carrier in an aqueous solution of said high-molecular organic compound and thereafter drying the drenched honeycomb carrier at a temperature of not more than 200° C.

3. A method according to claim 2, wherein said deposition of the catalyst component was effected by immersing said carrier coated with the high-molecular organic compound in an aqueous medium containing a catalyst composition and subsequently drying the drenched carrier.

4. A method according to claim 3, wherein said catalyst composition is a composition of a compound of catalytically active component.

5. A method according to claim 3, wherein said catalyst composition is a composition of a compound of catalytically active component with an active refractory metal compound.

6. A method according to claim 2, wherein said deposition of the catalyst component is effected by immersing a carrier coated with said high-molecular organic compound in either a solution of a soluble compound capable of forming an active refractory metal oxide or a dispersion having said metal oxide dispersed in an aqueous medium, drying the drenched carrier, calcining the dried carrier, and thereafter immersing the resultant carrier at least once in a solution containing at least one compound of catalytically active component selected from the group consisting of base metal compounds and noble metal compounds.

7. A method according to claim 2, wherein said deposition of the catalyst component is effected by immersing the carrier coated with the high-molecular organic compound at least once in a liquid obtained by adding at least one catalytically active component selected from the group consisting of base metal compounds and noble metal compounds to either a solution of a soluble compound capable of forming an active refractory metal oxide or a dispersion having said metal oxide dispersed in an aqueous medium.

8. A method according to claim 2, wherein said deposition of the catalyst component is effected by immersing a carrier coated with a water-soluble high molecular organic compound in a dispersion obtained by depositing at least one catalytically active component or a compound selected from the group consisting of base metals, noble metals and compounds thereof on an active refractory metal oxide, calcining and fixing the resultant composite thereby producing a catalyst composition, and dispersing said catalyst composition in an aqueous medium.

9. A method according to claim 2, wherein the amount of said coat of a water-soluble high-molecular organic compound is 0.02–1.0 parts by weight based on 100 parts by weight, as solids, of said carrier.

10. A method according to claim 2, wherein the concentration of said aqueous solution of a high-molecular organic compound is in the range of 0.5 to 50% by weight.

11. A method according to claim 2, wherein the viscosity of said aqueous solution of a high-molecular organic compound is not more than 500 cps.

12. A method according to claim 3, wherein an organic acid salt or inorganic acid salt of active refractory metal is present in said aqueous medium containing a catalyst composition.

13. A method according to claim 6, wherein an organic acid or inorganic acid is present in said dispersion of an active refractory metal oxide.

14. A method according to claim 6, wherein an organic acid or inorganic acid is present in said solution containing a catalytically active component.

15. A method according to claim 6, wherein a carrier composition obtained by immersing a carrier in at least one liquid selected from the group consisting of a dispersion of an active refractory metal oxide and a solution containing a catalytically active component is brought into contact with a gas containing a basic compound to neutralize a residual acid component.

16. A method according to claim 1, wherein said water-soluble high-molecular organic compound is selected from the group consisting of polyvinyl alcohol, polymers of acrylic acid and ammonium salts thereof and copolymers of maleic acid and ammonium salts thereof.

17. A method according to claim 16, wherein said water-soluble high-molecular orgainc compound is selected from the group consisting of polyvinyl alcohol, polyacrylic acid and polyammonium acrylate.

18. A method according to claim 5, wherein said active refractory metal oxide is selected from the group consisting of alumina, silica-alumina, magnesia, titania, zirconia, silica and silica-magnesia.

19. A method according to claim 18, wherein said active refractory metal oxide is alumina or zircona.

20. A method according to claim 19, wherein said active refractory metal oxide is active alumina.

21. A method according to claim 1, wherein said catalyst component is at least one noble metal selected from the group consisting of palladium, rhodium, ruthenium and iridium.

22. A method according to claim 21, wherein said catalyst component is at least one noble metal selected from the group consisting of platinum, palladium and rhodium.

23. A method according to claim 15, wherein said basic compound is ammonia.

* * * * *